United States Patent
Oshima et al.

(10) Patent No.: US 8,313,254 B2
(45) Date of Patent: Nov. 20, 2012

(54) IMAGE PICKUP APPARATUS

(75) Inventors: Yoshihiro Oshima, Kanagawa (JP); Shozo Masuda, Tokyo (JP); Naoji Nada, Kanagawa (JP); Kazuhito Shimoda, Kyoto (JP); Yasutoshi Katsuda, Osaka (JP); Hideaki Inoue, Gifu (JP); Yasuro Nakagawa, Aichi (JP)

(73) Assignee: Sony Corporation, Tokyo (JP)

( * ) Notice: Subject to any disclaimer, the term of this patent is extended or adjusted under 35 U.S.C. 154(b) by 163 days.

(21) Appl. No.: 12/779,366

(22) Filed: May 13, 2010

(65) Prior Publication Data

US 2010/0310247 A1 Dec. 9, 2010

(30) Foreign Application Priority Data

Jun. 8, 2009 (JP) ................................. 2009-137289

(51) Int. Cl.
- *G03B 17/00* (2006.01)
- *G02B 1/10* (2006.01)

(52) U.S. Cl. ....................... 396/447; 359/583
(58) Field of Classification Search .................. 396/447; 359/839, 583
See application file for complete search history.

(56) References Cited

U.S. PATENT DOCUMENTS

| | | | | |
|---|---|---|---|---|
| 4,602,861 A | * | 7/1986 | Taniguchi et al. | 396/81 |
| 4,627,688 A | * | 12/1986 | Kobayashi et al. | 359/634 |
| 5,760,853 A | * | 6/1998 | Yamashita | 349/30 |
| 2007/0019939 A1 | * | 1/2007 | Takase et al. | 396/111 |
| 2007/0109673 A1 | * | 5/2007 | Padiyath et al. | 359/839 |
| 2008/0075441 A1 | * | 3/2008 | Jelinek et al. | 396/18 |

FOREIGN PATENT DOCUMENTS

| | | |
|---|---|---|
| JP | 2-89032 | 3/1990 |
| JP | 3-109504 | 5/1991 |
| JP | 8-254751 | 10/1996 |
| JP | 2006-350253 | 12/2006 |

* cited by examiner

*Primary Examiner* — Clayton E LaBalle
*Assistant Examiner* — Noam Reisner
(74) *Attorney, Agent, or Firm* — Oblon, Spivak, McClelland, Maier & Neustadt, L.L.P.

(57) ABSTRACT

An image pickup apparatus includes a light-beam splitting mirror configured to transmit and reflect incident light that has entered the light-beam splitting mirror through a photographing optical system; an image sensor that receives light transmitted through the light-beam splitting mirror; an autofocus detecting unit that receives light reflected by the light-beam splitting mirror; a signal processing unit configured to process an image pickup signal of the image sensor; and a display unit configured to display an image being photographed, on the basis of an image signal obtained at the signal processing unit. In the image pickup apparatus, the light-beam splitting mirror has spectral characteristics including a reflectivity of 25% or more and 35% or less at a wavelength of 400 to 650 nm and a reflectivity of 60% or more at a wavelength of about 700 nm through optimization.

10 Claims, 9 Drawing Sheets

| LAYER | MATERIAL | BASIC DESIGN THICKNESS (nm) | AFTER OPTIMIZATION THICKNESS (nm) |
|---|---|---|---|
|  | AIR |  |  |
| T1 | $SiO_2$ | 79.99 | 87.49 |
| T2 | $Nb_2O_5$ | 93.08 | 93.16 |
| T3 | $SiO_2$ | 159.97 | 169.82 |
| T4 | $Nb_2O_5$ | 93.08 | 110.15 |
| T5 | $SiO_2$ | 159.97 | 171 |
| T6 | $Nb_2O_5$ | 93.08 | 38.47 |
| T7 | $SiO_2$ | 159.97 | 115.76 |
| T8 | $Nb_2O_5$ | 93.08 | 109.78 |
|  | BASE |  |  |

| LAYER | MATERIAL | BASIC DESIGN | AFTER OPTIMIZATION |
|---|---|---|---|
| | | THICKNESS (nm) | THICKNESS (nm) |
| | AIR | | |
| T1 | $SiO_2$ | 79.99 | 90.12 |
| T2 | $Nb_2O_5$ | 93.08 | 94.26 |
| T3 | $SiO_2$ | 159.97 | 169.88 |
| T4 | $Nb_2O_5$ | 93.08 | 102.29 |
| T5 | $SiO_2$ | 159.97 | 139.29 |
| T6 | $Nb_2O_5$ | 93.08 | 123.05 |
| T7 | $SiO_2$ | 159.97 | 106.1 |
| T8 | $Nb_2O_5$ | 93.08 | 99.01 |
| T9 | $SiO_2$ | 159.97 | 39.82 |
| T10 | $Nb_2O_5$ | 93.08 | 100.64 |
| | BASE | | |

| LAYER | MATERIAL | BASIC DESIGN | AFTER OPTIMIZATION |
|---|---|---|---|
| | | THICKNESS (nm) | THICKNESS (nm) |
| | AIR | | |
| T1 | $SiO_2$ | 79.99 | 86.89 |
| T2 | $Nb_2O_5$ | 93.08 | 88.62 |
| T3 | $SiO_2$ | 159.97 | 167.21 |
| T4 | $Nb_2O_5$ | 93.08 | 87.2 |
| T5 | $SiO_2$ | 159.97 | 153.72 |
| T6 | $Nb_2O_5$ | 93.08 | 93.26 |
| T7 | $SiO_2$ | 159.97 | 133.41 |
| T8 | $Nb_2O_5$ | 93.08 | 102.67 |
| T9 | $SiO_2$ | 159.97 | 135.9 |
| T10 | $Nb_2O_5$ | 93.08 | 132.33 |
| T11 | $SiO_2$ | 159.97 | 149.26 |
| T12 | $Nb_2O_5$ | 93.08 | 71.44 |
| | BASE | | |

| LAYER | MATERIAL | BASIC DESIGN | AFTER OPTIMIZATION |
|---|---|---|---|
| | | THICKNESS (nm) | THICKNESS (nm) |
| | AIR | | |
| T1 | $SiO_2$ | 79.99 | 61.47 |
| T2 | $Nb_2O_5$ | 93.08 | 93.01 |
| T3 | $SiO_2$ | 159.97 | 118.24 |
| T4 | $Nb_2O_5$ | 93.08 | 67.68 |
| | BASE | | |

| LAYER | MATERIAL | BASIC DESIGN THICKNESS (nm) | AFTER OPTIMIZATION THICKNESS (nm) |
|---|---|---|---|
| | AIR | | |
| T1 | SiO$_2$ | 79.99 | 78.52 |
| T2 | Nb$_2$O$_5$ | 93.08 | 91.74 |
| T3 | SiO$_2$ | 159.97 | 170.18 |
| T4 | Nb$_2$O$_5$ | 93.08 | 98.6 |
| T5 | SiO$_2$ | 159.97 | 102.64 |
| T6 | Nb$_2$O$_5$ | 93.08 | 56.92 |
| | BASE | | |

FIG. 12

IMAGE PICKUP APPARATUS

BACKGROUND OF THE INVENTION

1. Field of the Invention

The present invention relates to an image pickup apparatus used for, for example, a single-lens reflex camera.

2. Description of the Related Art

Widely used single-lens reflex cameras include movable mirrors and have a structure in which the mirrors are moved away from the image capturing optical path just before a photographing operation and the mirrors return to the optical path immediately after the photographing operation to guide subject light to a viewfinder optical system. As a result, a viewfinder image disappears during the photographing operation and the subject is not viewed at the moment of the photographing operation. In particular, when photographs of sports, racing, animals, and the like are taken, the motion of the subject is fast, whereby it is quite difficult to take photographs with the subject being followed during continuous shooting operations. Consequently, a critical moment is sometimes missed.

On the other hand, there have been proposed single-lens reflex cameras having a function of splitting light beams with a fixed mirror (e.g., refer to Japanese Unexamined Patent Application Publication Nos. 3-109504 (Patent Document 1), 2006-350253 (Patent Document 2), and 8-254751 (Patent Document 3)). This type of single-lens reflex camera includes a light-beam splitting mirror (also referred to as a pellicle mirror) that is a fixed mirror which guides light beams to a viewfinder system. This mirror splits photographing light in a direction toward a viewfinder system and in a direction toward a film surface at all times, which allows a user to observe the state of a subject through a viewfinder during the photographing operation.

Patent Document 1 discloses a film design of a light-beam splitting mirror used for a single-lens reflex camera. In Patent Document 1, the intensities of transmitted light (light guided to an image sensor) and reflected light (light guided to the viewfinder side) when a light-beam splitting mirror is disposed at 45 degrees are each set to be 50%. In this case, since the quantity of light provided to a film decreases, exposure time is increased and the range of light of a flash is shortened. To solve such problems, it is necessary to provide the light-beam splitting mirror with a movement mechanism (refer to Patent Document 3) included in widely used mirrors when photographs are taken using a flash.

Furthermore, Japanese Patent No. 2801217 (Patent Document 4) discloses a system in which an autofocus detecting device is disposed at a lower position in a camera and light transmitted through a light-beam splitting mirror is again guided to the autofocus detecting device using a movable mirror. In this system, manufacturing cost may be increased due to the complicated mechanism of the system and dust may be produced due to the presence of a movable member on the inner side of the fixed mirror.

SUMMARY OF THE INVENTION

In recent single-lens reflex digital cameras, a display such as a liquid crystal display (LCD) panel is disposed on the back of a camera body such that an image inputted to an image pickup device can be viewed using the display. For example, there has been proposed a single-lens reflex digital camera, having no optical viewfinder, that allows a user to take photographs while the user checks an image using a display disposed on the back of a camera body. In such a structure, an autofocus detecting device is disposed at an upper position in the camera body and light reflected by a light-beam splitting mirror can be guided to the autofocus detecting device. However, when light-beam splitting mirrors disclosed in Patent Documents 1 to 4 are used, the light quantity of transmitted light guided to an image sensor is increased compared with that of reflected light to improve the quality of photographed images. As a result, the light quantity of photographing light guided to an autofocus detecting device becomes insufficient.

Thus, it is desirable to provide an image pickup apparatus that can solve the problem in that the light quantity of photographing light reflected by the light-beam splitting mirror and guided to the autofocus detecting device becomes insufficient.

According to an embodiment of the present invention, there is provided an image pickup apparatus including a light-beam splitting mirror configured to transmit and reflect incident light that has entered the light-beam splitting mirror through a photographing optical system; an image sensor that receives light transmitted through the light-beam splitting mirror; an autofocus detecting unit that receives light reflected by the light-beam splitting mirror; a signal processing unit configured to process an image pickup signal of the image sensor; and a display unit configured to display an image being photographed, on the basis of an image signal obtained at the signal processing unit. In the image pickup apparatus, the light-beam splitting mirror has spectral characteristics including a reflectivity of 25% or more and 35% or less at a wavelength of 400 to 650 nm and a reflectivity of 60% or more at a wavelength of about 700 nm through optimization.

Assuming that H denotes a thickness of a high refractive index material and L denotes a thickness of a low refractive index material, the light-beam splitting mirror is preferably obtained by stacking layers composed of the high refractive index material and layers composed of the low refractive index material on a plastic film so as to satisfy formula (1):

$$(HL)^n HL/2 \qquad (1)$$

where n is an integer that indicates the number of repetitions ($n \geq 3$).

In the spectral characteristics, the reflectivity is preferably 60% or more in a wavelength range longer than the wavelength of about 700 nm.

The image pickup apparatus further includes an autofocus auxiliary light generating unit configured to generate autofocus auxiliary light having a wavelength of about 700 nm.

The light-beam splitting mirror preferably reflects the incident light in an upward direction and the autofocus detecting unit is preferably disposed at an upper position in a casing.

In the present invention, when the autofocus auxiliary light is used, the returned light out of the autofocus auxiliary light can be reflected at a reflectivity higher than that of light having a different wavelength and guided to the autofocus detecting device. Furthermore, since the reflectivity to light having a wavelength longer than about 700 nm is set to be high, the incidence of light having such a wavelength on the image sensor can be suppressed, which provides the light-beam splitting mirror with a function of an infrared light filter. Thus, an additional infrared light filter is not necessary on the front surface or the like of the image sensor, which can reduce the cost and weight of the image pickup apparatus.

DESCRIPTION OF THE PREFERRED EMBODIMENTS

Embodiments of the present invention will now be described in the following order.
1. Schematic structure of single-lens reflex camera
2. Light-beam splitting mirror
3. Modification In the following description of the embodiments, various limitations that are technically preferable are added to the description because they are preferred specific examples of the present invention. However, the scope of the present invention is not limited to these embodiments unless there is an explicit description for limiting the scope of the invention.

1. Schematic Structure of Single-Lens Reflex Camera

Figure 1:
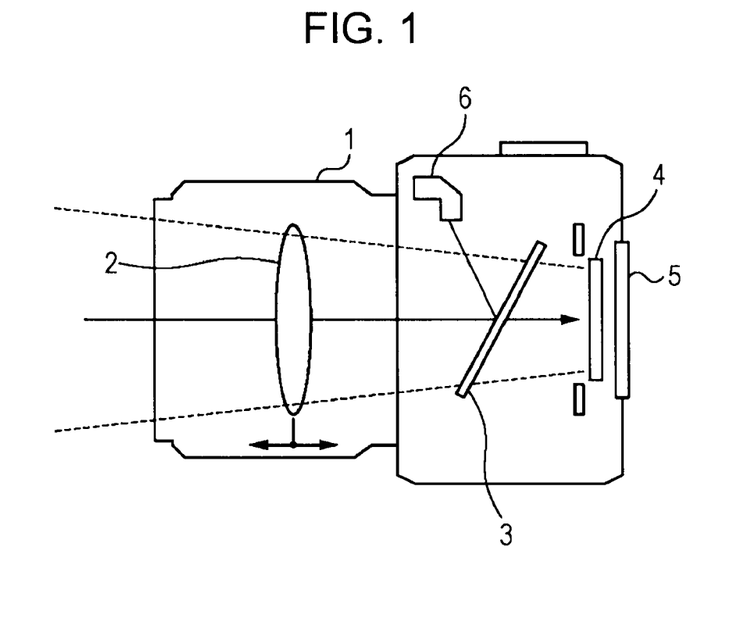
FIG. 1 shows a schematic structure of a single-lens reflex camera to which the present invention can be applied.

An image pickup apparatus according to an embodiment of the present invention will now be described with reference to FIG. 1. This embodiment is an example in which the present invention is applied to a single-lens reflex digital camera. An exchangeable photographing optical system 2 including a taking lens, a diaphragm, and the like is disposed in a barrel 1 of a camera casing. The taking lens of the photographing optical system 2 is driven by a focus driving system (not shown) and can perform an autofocus operation.

Light (subject light) transmitted through the photographing optical system 2 enters a light-beam splitting mirror 3. The light-beam splitting mirror 3 reflects and transmits the light transmitted through the photographing optical system 2. Light transmitted through the light-beam splitting mirror 3 enters an image sensor 4. As described below, the spectral characteristics of the light-beam splitting mirror 3 are designed such that the reflectivity is 25% or more and 35% or less at a wavelength of 400 to 650 nm and 60% or more at a wavelength of about 700 nm.

The image sensor 4 is a sensor such as a charge coupled device (CCD) or a complementary metal oxide semiconductor (CMOS). An image pickup signal extracted from the image sensor 4 is supplied to an image pickup signal processing circuit (not shown) and a signal obtained by compressing the image pickup signal is stored in a recording medium such as a flash memory. Furthermore, a subject that is being photographed is displayed on a display 5 disposed on a back surface of a camera. The display 5 is a flat display such as an LCD or an organic electroluminescence (EL) display.

Light reflected by the light-beam splitting mirror 3 is guided to an autofocus detecting device 6 disposed at an upper position in a camera. The autofocus detecting device 6 includes an image sensor (area sensor) that receives the light reflected by the light-beam splitting mirror 3, a signal processing unit that processes an output signal of the image sensor, and a driving unit that controls the position of an autofocus lens of the photographing optical system 2. At the signal processing unit, an autofocus evaluation value is determined using an image pickup signal of a designated area of the photographed image or the entire area of the photographed image. The position of the autofocus lens of the photographing optical system 2 is controlled such that the autofocus evaluation value is maximized.

One of a phase-difference autofocus method and a contrast-detecting autofocus method or a method that is a combination thereof can be used. Furthermore, to appropriately perform autofocusing on a subject having a low contrast or in a dark place, autofocus auxiliary light is emitted and the autofocus evaluation value is determined from returned light. An example of the autofocus auxiliary light is infrared light with a wavelength of about 700 nm, and an infrared light-generating light-emitting diode (LED) that generates infrared light is disposed on the front face of the camera. Alternatively, the same autofocus auxiliary light may be generated using an external flash unit. The autofocus detecting device has high sensitivity to the autofocus auxiliary light with the above-described wavelength.

The display 5 has a function as an electronic viewfinder. That is, an image signal obtained by processing the image pickup signal of the image sensor 4 at the signal processing unit is supplied to the display 5 and thus a subject image (moving images) being photographed at that moment is displayed. In the structure shown in FIG. 1, an optical viewfinder is not disposed, and light reflected in an upward direction by the light-beam splitting mirror 3 is guided to the autofocus detecting device 6 to perform autofocusing. By removing the optical viewfinder, optical components such as a focusing glass, a pentaprism, and an eyepiece unit become unnecessary. However, both the optical viewfinder and the autofocus detecting device 6 can be disposed at an upper position by figuring out an appropriate arrangement of the optical system.

2. Light-Beam Splitting Mirror

In the present invention, to prevent lack of light quantity of light guided to the autofocus detecting device 6 while ensuring light quantity of light guided to the image sensor 4, the spectral characteristics (wavelength selectivity) of the light-beam splitting mirror 3 are designed. In particular, by ensuring the reflectivity to the autofocus auxiliary light (wavelength: 700 nm), an autofocus operation is stably performed in a dark field that uses auxiliary light.

In the spectral characteristics of the light-beam splitting mirror 3 according to an embodiment of the present invention, for example, the transmittance at a wavelength of 400 to 650 nm within a visible light region is 65% or more and 75% or less and the reflectivity to the autofocus auxiliary light (wavelength: about 700 nm) guided to the autofocus detecting device 6 is 60% or more. Such spectral characteristics can provide a sufficient quantity of light guided to the image sensor 4 and a sufficient quantity of autofocus auxiliary light guided to the autofocus detecting device 6. The present invention can provide a light-weight small-size digital camera.

In the present invention, the light-beam splitting mirror 3 is constituted by an optical multilayer film obtained by alternately stacking dielectric thin films with a high refractive index (hereinafter referred to as "high refractive index layers") and dielectric thin films with a low refractive index (hereinafter referred to as "low refractive index layers"). The high refractive index layers are composed of a high refractive index material having a refractive index of 2 or more (e.g., 2.0 to 2.5). The low refractive index layers are composed of a low refractive index material having a refractive index of less than 1.6.

The optical multilayer film is formed on a plastic film used as a base. The plastic film is transparent within a visible light region. The plastic film is preferably composed of polyethylene terephthalate (PET), cycloolefin polymer (COP), polycarbonate (PC), polyethersulfone (PES), polyethylene naphthalate (PEN), or triacetyl cellulose (TAC).

The high refractive index material is preferably composed of $In_2O_3$, $SnO_2$, ZnO, ITO, or an alloy thereof; or a transparent conductive material obtained by doping ZnO with Al or Ga. Alternatively, the high refractive index material is preferably composed of $TiO_2$, $Nb_2O_5$, $ZrO_2$, or $Ta_2O_5$. The low refractive index material is preferably composed of $MgF_2$, $AlF_3$, or $SiO_2$.

To achieve desired spectral characteristics, a design method of a short wave pass filter (SWPF) can be used. The SWPF is a dielectric multilayer film having spectral characteristics of reflecting light with a long wavelength and transmitting light with a short wavelength. The basic design of the SWPF is represented by the following formula:

$$L/2 \cdot H \cdot L \ldots L \cdot H \cdot L/2 = L/2(HL)^n HL/2$$

where H denotes a thickness that satisfies (refractive index of high refractive index material)×thickness=$\lambda/4$; L denotes a thickness that satisfies (refractive index of low refractive index material)×thickness=$\lambda/4$; $\lambda$ is a design center wavelength; . . . means repetitions; and n is an integer that indicates the number of the repetitions.

Since a plastic film such as PET (refractive index: 1.65) is used as a base, the first layer (L/2) in the formula above can be regarded as the plastic film. Thus, the formula above is simplified into the following formula (1).

$$(HL)^n HL/2 \tag{1}$$

where n is an integer that indicates the number of repetitions.

In the present invention, n is set to 3 or more, the thicknesses H and L are determined through the basic design, and optimization is performed, whereby an intended spectral characteristics (the reflectivity is 25% or more and 35% or less at an wavelength of 400 to 650 nm and 60% or more at a wavelength of about 700 nm) are achieved.

The advantages described below can be achieved by employing the light-beam splitting mirror having such spectral characteristics.

1. A sufficient quantity of subject light can be guided to an autofocus detecting device by adjusting the reflectivity to light with a wavelength to which the autofocus detecting device has high sensitivity to 25% or more and 35% or less, which can solve a problem in that light quantity becomes insufficient for autofocus detecting.

2. When autofocus auxiliary light is used to perform photographing on a subject having a low contrast or in a dark place, the returned light out of the autofocus auxiliary light can be reflected at a reflectivity higher than that of light having a different wavelength and guided to the autofocus detecting device 6.

3. Since the reflectivity to light having a wavelength longer than about 700 nm is set to be high, the incidence of light having such a wavelength on the image sensor 4 can be suppressed, which provides the light-beam splitting mirror 3 with a function of an infrared light filter. Thus, an additional infrared light filter is not necessary on the front surface or the like of the image sensor 4, which can reduce the cost and weight of the image pickup apparatus.

EXAMPLES

Examples of the light-beam splitting mirror according an embodiment of the present invention will now be described.

Example 1

Figure 2:
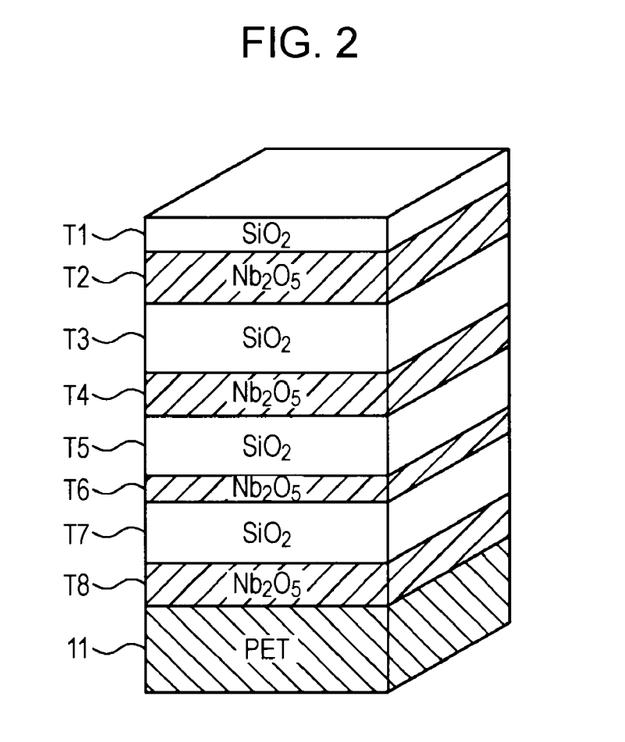
FIG. 2 shows a stacked structure of Example 1 of a light-beam splitting mirror according to an embodiment of the present invention.

FIG. 2 shows a stacked structure of Example 1 of the light-beam splitting mirror according to an embodiment of the present invention. A plastic film 11 as a base is composed of PET. An optical multilayer film obtained by forming eight layers T1 to T8 by sputtering is formed on the plastic film 11. For example, the film formation is performed using a post-oxidation sputtering apparatus with a carousel-type substrate holder. Alternatively, other sputtering methods can also be used. The film formation may be performed by vapor deposition. In Example 1, the low refractive index material is composed of $SiO_2$ and the high refractive index material is composed of $Nb_2O_5$.

Figure 3:
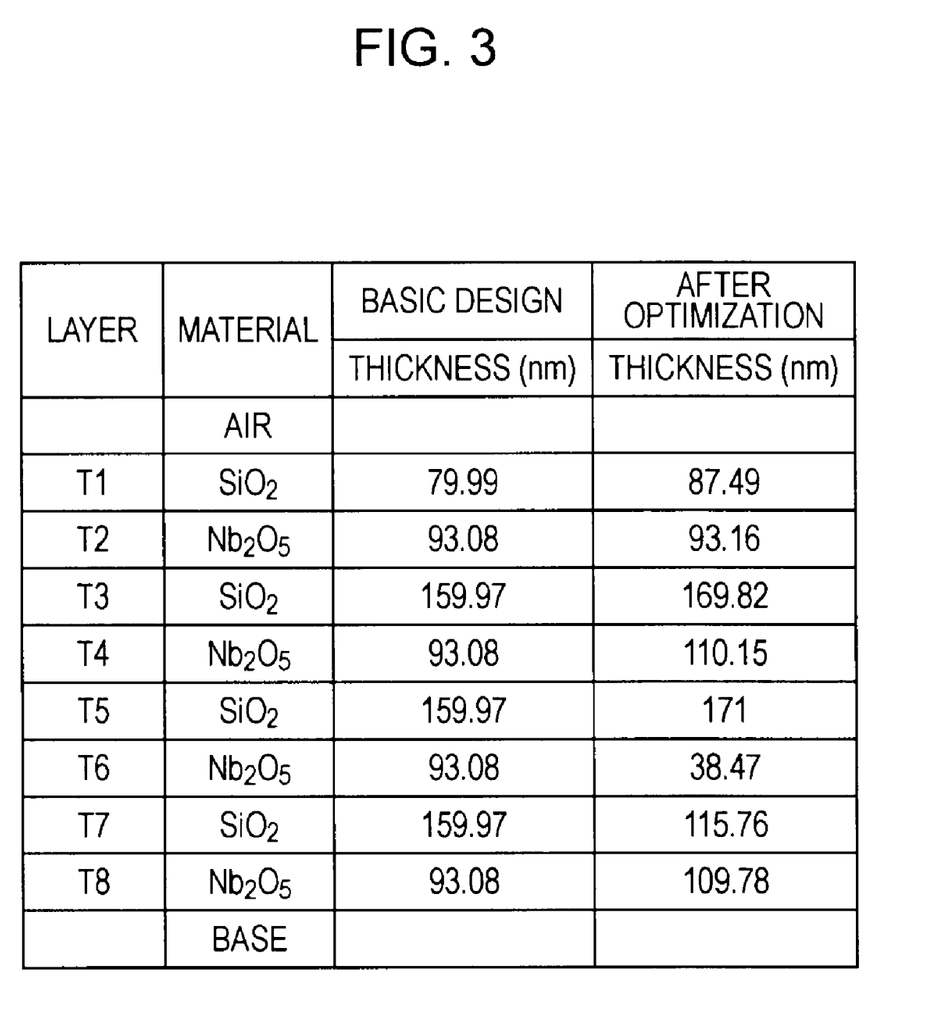
FIG. 3 shows a thickness of each of layers obtained through basic design and a thickness of each of the layers obtained after optimization in Example 1.

By setting the design center wavelength $\lambda$ to 800 nm and performing basic design to obtain a leading edge of a characteristic curve at a wavelength of about 650 nm, the thickness of each of the layers can be obtained as shown in FIG. 3. The high refractive index layer T8 is a layer formed on the plastic film 11 and the low refractive index layer T1 is a layer that contacts air.

In Example 1, n (the number of repetitions) is three. Referring to formula (1), the layers T8 to T3 are constituted by two-layer pairs stacked three times. The layer T2 corresponds to "H" and the layer T1 corresponds to "L/2". The layer T1 has a thickness half that of other low refractive index layers L.

Figure 4:
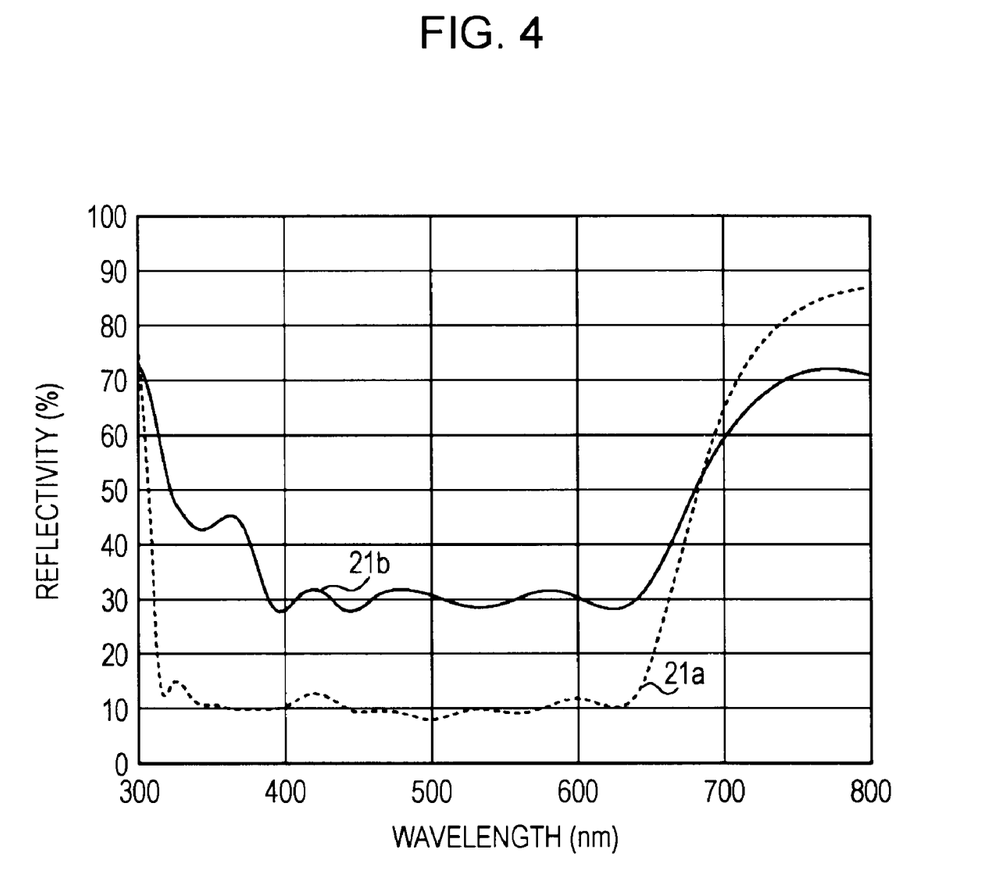
FIG. 4 shows spectral characteristics of Example 1.

The spectral characteristic 21a of the light-beam splitting mirror having a thickness obtained through basic design is indicated by a dashed line in FIG. 4. In FIG. 4, the horizontal axis shows wavelength (nm) and the vertical axis shows reflectivity (%). The transmittance is obtained by subtracting the reflectivity (%) from 100%. The spectral characteristic 21a satisfies the condition that the reflectivity is 60% or more at a wavelength of 700 nm. Since the spectral characteristic 21a has a sufficiently low reflectivity at a wavelength of 400 to 650 nm, the light having a wavelength within such a range can be caused to enter the image sensor 4. However, the reflectivity in that range is too low compared with the intended reflectivity (25% or more and 35% or less), and therefore optimization is performed.

Computer-based software for optimization can be used. For example, TFCalc (registered trademark, available from Software Spectra Inc.) can be used to calculate the characteristics of optical thin films. That is, the intended optical characteristics (the reflectivity is 25% or more and 35% or less at a wavelength of 400 to 650 nm and 60% or more at a wavelength of 700 nm) were set and the optimization was performed using a genetic algorithm.

As a result of the optimization, the thickness of each of the layers T1 to T8 was obtained as shown in FIG. 3, and the spectral characteristic 21b was obtained as shown in FIG. 4. It is clear from FIG. 4 that optical characteristics including a reflectivity of 25% or more and 35% or less at a wavelength of 400 to 650 nm and a reflectivity of 60% or more at a wavelength of 700 nm were obtained. As described in Example 1, high refractive index layers and low refractive index layers are alternately stacked to generate interference of light, whereby intended spectral characteristics can be realized.

Example 2

Figure 5:
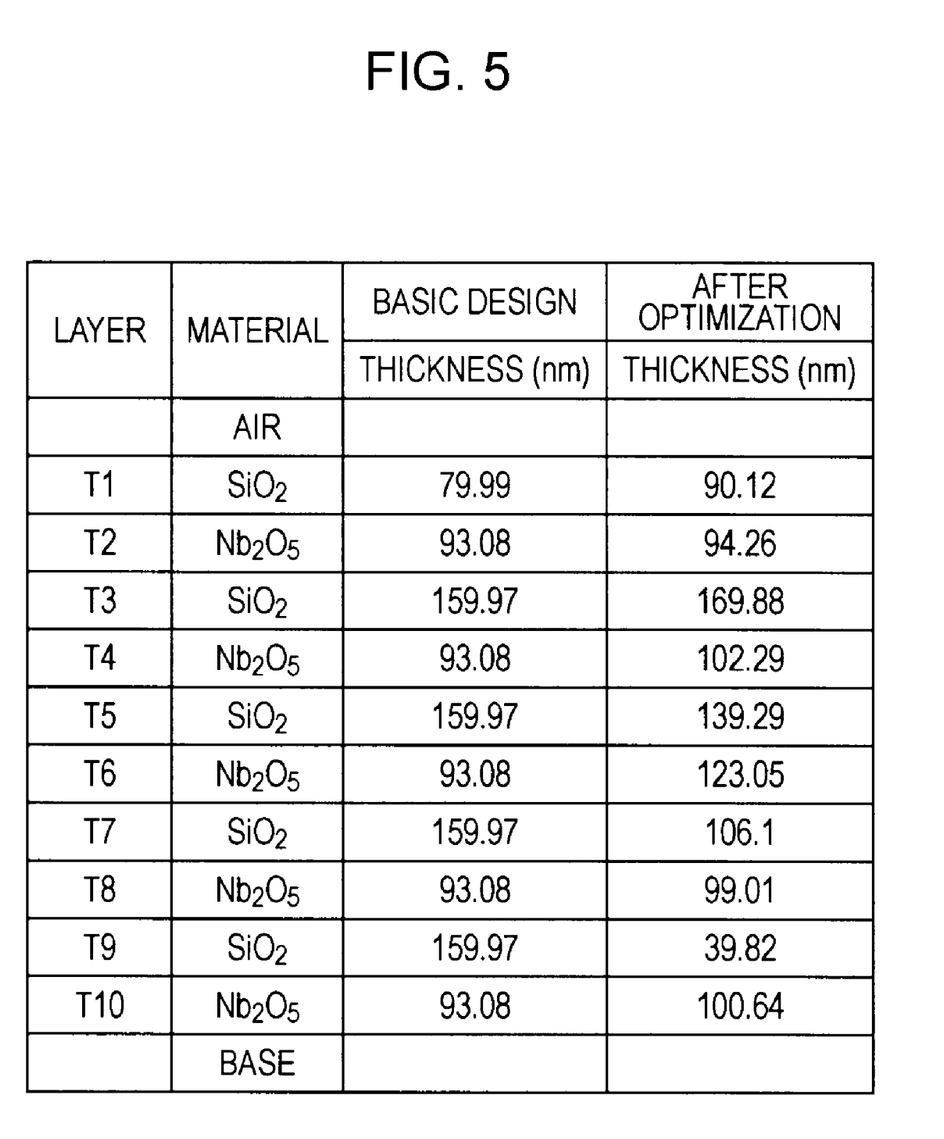
FIG. 5 shows a thickness of each of layers obtained through basic design and a thickness of each of the layers obtained after optimization in Example 2 of a light-beam splitting mirror according to an embodiment of the present invention.

In Example 2, a plastic film 11 (PET) is used as a base. As in Example 1, the low refractive index material is composed of $SiO_2$ and the high refractive index material is composed of $Nb_2O_5$. An optical multilayer film obtained by forming ten layers T1 to T10 in the same manner as in Example 1 is formed on the plastic film 11.

By setting the design center wavelength λ to 800 nm and performing basic design to obtain a leading edge of a characteristic curve at a wavelength of about 650 nm, the thickness of each of the layers can be obtained as shown in FIG. 5. The high refractive index layer T10 is a layer formed on the plastic film 11 and the low refractive index layer T1 is a layer that contacts air.

In Example 2, n (the number of repetitions) is four. Referring to formula (1), the layers T10 to T3 are constituted by two-layer pairs stacked four times. The layer T2 corresponds to "H" and the layer T1 corresponds to "L/2". The layer T1 has a thickness half that of other low refractive index layers L.

Figure 6:
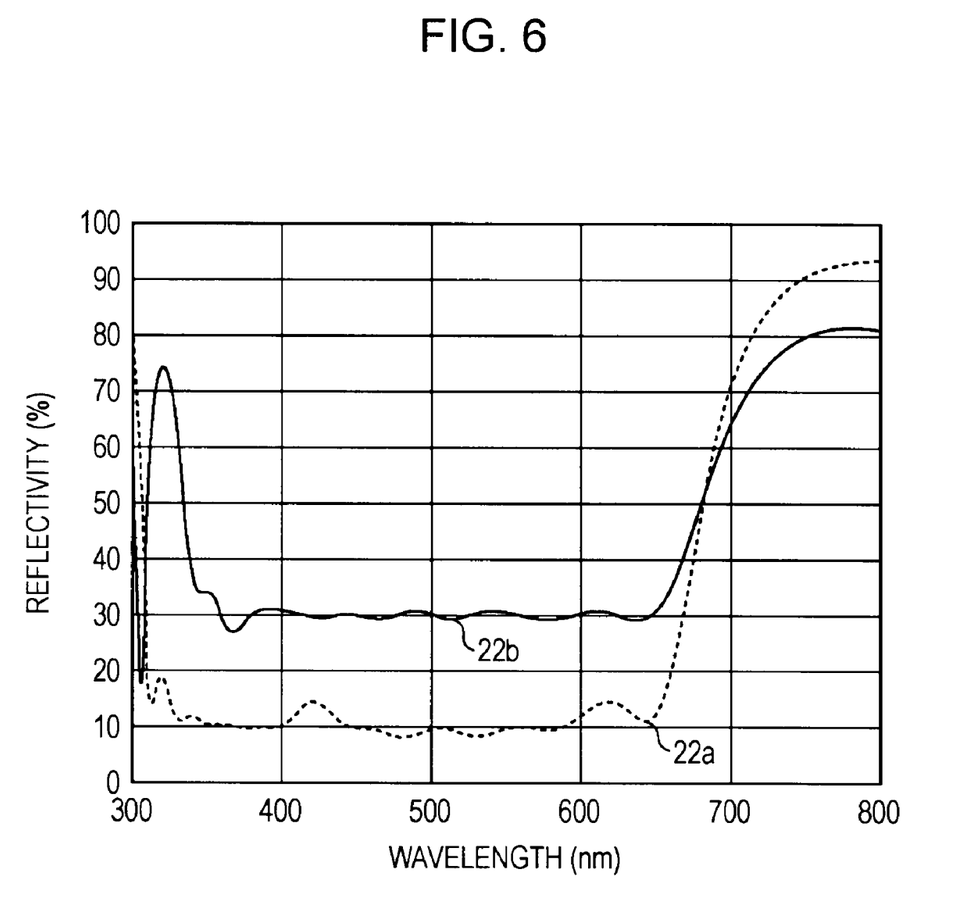
FIG. 6 shows spectral characteristics of Example 2.

The spectral characteristic 22a of the light-beam splitting mirror having a thickness obtained through basic design is indicated by a dashed line in FIG. 6. In FIG. 6, the horizontal axis shows wavelength (nm) and the vertical axis shows reflectivity (%). The spectral characteristic 22a satisfies the condition that the reflectivity is 60% or more at a wavelength of 700 nm. In the spectral characteristic 22a, however, the reflectivity at a wavelength of 400 to 650 nm is too low compared with the intended reflectivity (25% or more and 35% or less), and therefore optimization is performed.

As in Example 1, optimization was performed using TFCalc (registered trademark, available from Software Spectra Inc.). As a result of the optimization, the thickness of each of the layers T1 to T10 was obtained as shown in FIG. 5, and the spectral characteristic 22b was obtained as shown in FIG. 6. It is clear from FIG. 6 that optical characteristics including a reflectivity of 25% or more and 35% or less at a wavelength of 400 to 650 nm and a reflectivity of 60% or more at a wavelength of 700 nm were obtained.

Example 3

Figure 7:
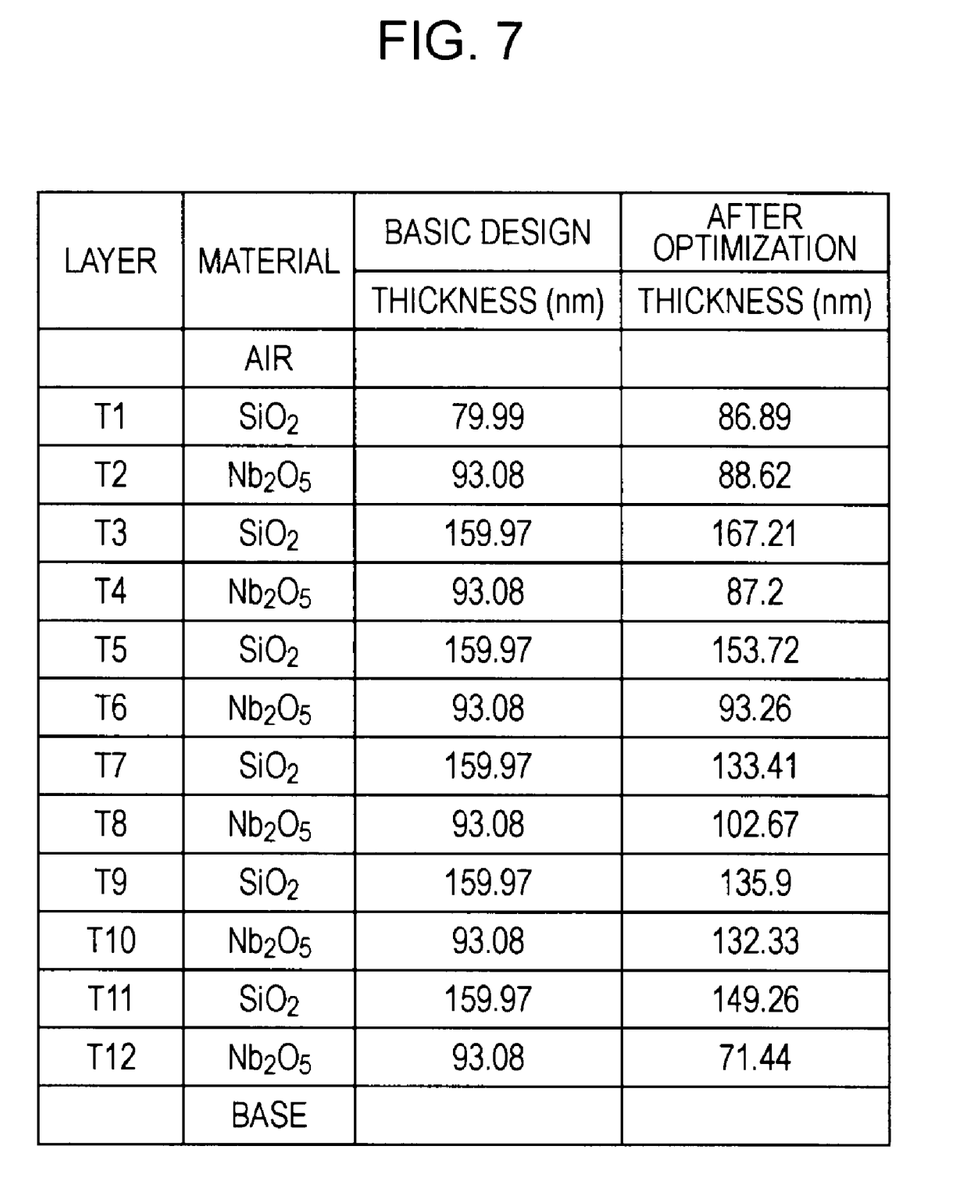
FIG. 7 shows a thickness of each of layers obtained through basic design and a thickness of each of the layers obtained after optimization in Example 3 of a light-beam splitting mirror according to an embodiment of the present invention.

In Example 3, a plastic film 11 (PET) is used as a base. As in Example 1, the low refractive index material is composed of $SiO_2$ and the high refractive index material is composed of $Nb_2O_5$. An optical multilayer film obtained by forming twelve layers T1 to T12 in the same manner as in Example 1 is formed on the plastic film 11.

By setting the design center wavelength λ to 800 nm and performing basic design to obtain a leading edge of a characteristic curve at a wavelength of about 650 nm, the thickness of each of the layers can be obtained as shown in FIG. 7. The high refractive index layer T12 is a layer formed on the plastic film 11 and the low refractive index layer T1 is a layer that contacts air.

In Example 3, n (the number of repetitions) is five. Referring to formula (1), the layers T12 to T3 are constituted by two-layer pairs stacked five times. The layer T2 corresponds to "H" and the layer T1 corresponds to "L/2". The layer T1 has a thickness half that of other low refractive index layers L.

Figure 8:
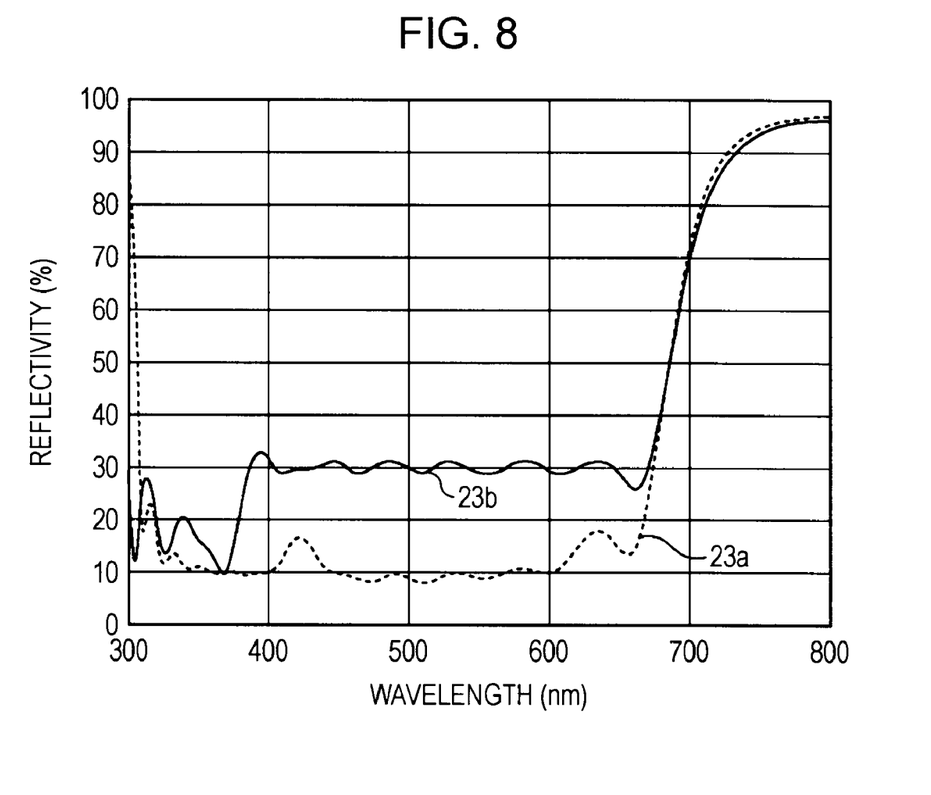
FIG. 8 shows spectral characteristics of Example 3.

The spectral characteristic 23a of the light-beam splitting mirror having a thickness obtained through basic design is indicated by a dashed line in FIG. 8. In FIG. 8, the horizontal axis shows wavelength (nm) and the vertical axis shows reflectivity (%). The spectral characteristic 23a satisfies the condition that the reflectivity is 60% or more at a wavelength of 700 nm. In the spectral characteristic 23a, however, the reflectivity at a wavelength of 400 to 650 nm is too low compared with the intended reflectivity (25% or more and 35% or less), and therefore optimization is performed.

As in Example 1, optimization was performed using TFCalc (registered trademark, available from Software Spectra Inc.). As a result of the optimization, the thickness of each of the layers T1 to T10 was obtained as shown in FIG. 7, and the spectral characteristic 23b was obtained as shown in FIG. 8. It is clear from FIG. 8 that optical characteristics including a reflectivity of 25% or more and 35% or less at a wavelength of 400 to 650 nm and a reflectivity of 60% or more at a wavelength of 700 nm were obtained.

As described above, the intended spectral characteristics are obtained by employing the light-beam splitting mirror having n=3 (eight layers), n=4 (ten layers), or n=5 (twelve layers). In contrast, the intended spectral characteristics are not obtained when a light-beam splitting mirror having n=1 (four layers) corresponding to Reference Example 1 or n=2 (six layers) corresponding to Reference Example 2 is employed.

Reference Example 1

Figure 9:
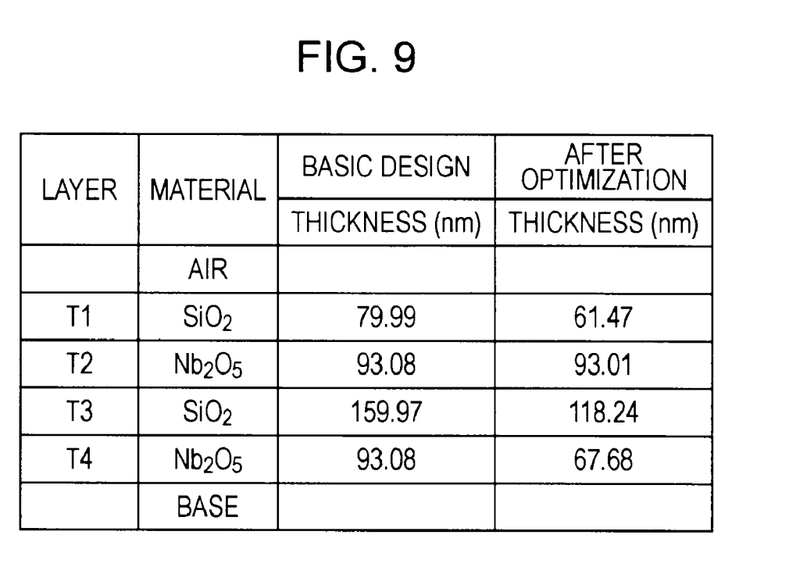
FIG. 9 shows a thickness of each of layers obtained through basic design and a thickness of each of the layers obtained after optimization in Reference Example 1 used as a reference of description of the present invention.

In Reference Example 1, a plastic film (PET) is used as a base. As in Example 1, the low refractive index material is composed of $SiO_2$ and the high refractive index material is composed of $Nb_2O_5$. An optical multilayer film obtained by forming four layers T1 to T4 in the same manner as in Example 1 is formed on the plastic film.

Figure 10:
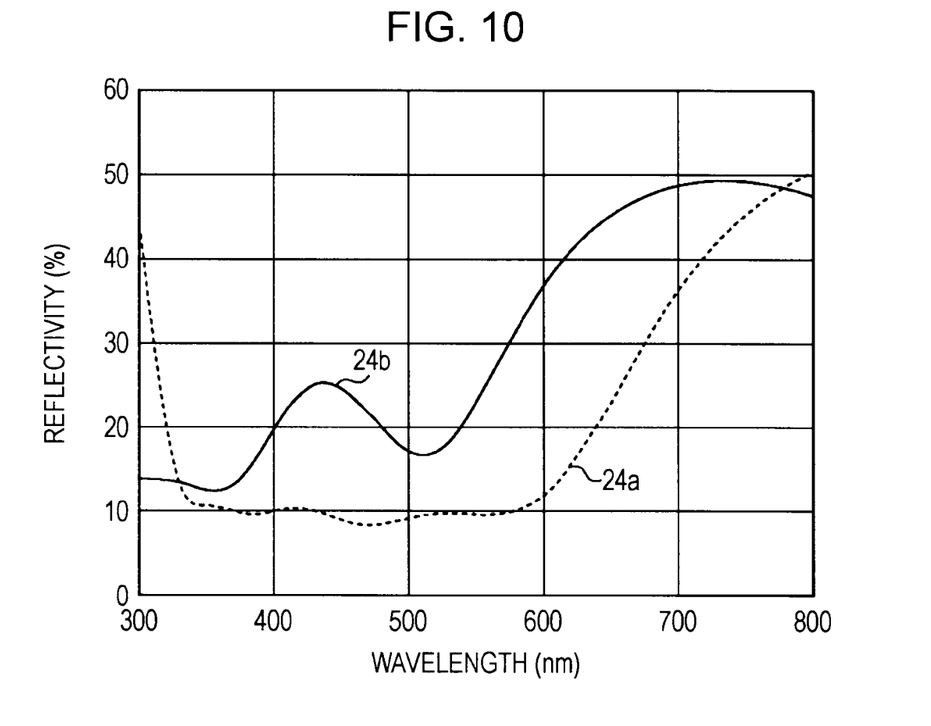
FIG. 10 shows spectral characteristics of Reference Example 1.

In Reference Example 1, n is one. By setting the design center wavelength λ to 800 nm and performing basic design, the thickness of each of the layers can be obtained as shown in FIG. 9. The high refractive index layer T4 is a layer formed on the plastic film and the low refractive index layer T1 is a layer that contacts air. The spectral characteristic 24a of the light-beam splitting mirror having a thickness obtained through basic design is indicated by a dashed line in FIG. 10. In FIG. 10, the horizontal axis shows wavelength (nm) and the vertical axis shows reflectivity (%).

In the spectral characteristic 24a, the reflectivity is less than 40% at a wavelength of 700 nm, which does not satisfy a reflectivity of 60% or more. Furthermore, the reflectivity at a wavelength of 400 to 650 nm is too low compared with the intended reflectivity (25% or more and 35% or less), and therefore optimization is performed.

As in Example 1, optimization was performed using TFCalc (registered trademark, available from Software Spectra Inc.). As a result of the optimization, the thickness of each of the layers T1 to T4 was obtained as shown in FIG. 9, and the spectral characteristic 24b was obtained as shown in FIG. 10. It is clear from FIG. 10 that optical characteristics including a reflectivity of 25% or more and 35% or less at a wavelength of 400 to 650 nm and a reflectivity of 60% or more at a wavelength of 700 nm were not achieved. That is, there is no solution to achieve the intended spectral characteristics with a four-layer structure.

Reference Example 2

Figure 11:
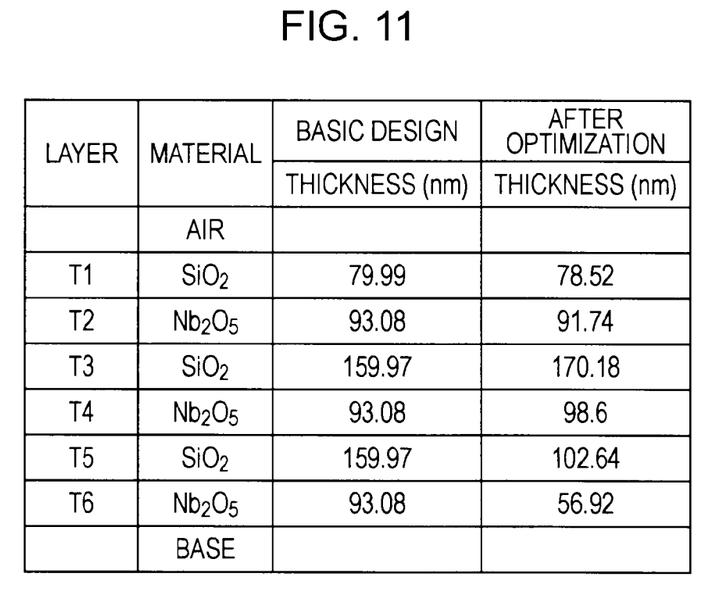
FIG. 11 shows a thickness of each of layers obtained through basic design and a thickness of each of the layers obtained after optimization in Reference Example 2 used as a reference of description of the present invention.

In Reference Example 2, a plastic film (PET) is used as a base. As in Example 1, the low refractive index material is composed of SiO₂ and the high refractive index material is composed of Nb₂O₅. An optical multilayer film obtained by forming six layers T1 to T6 in the same manner as in Example 1 is formed on the plastic film.

Figure 12:
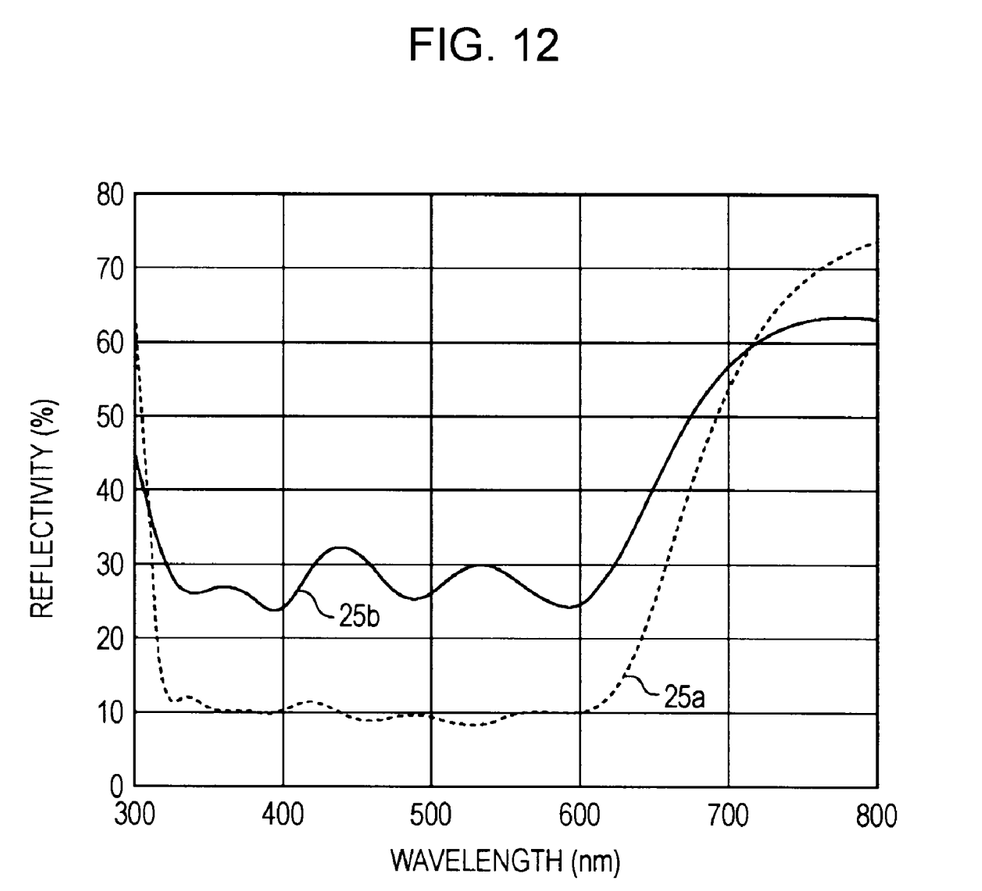
FIG. 12 shows spectral characteristics of Reference Example 2.

In Reference Example 2, n is two. By setting the design center wavelength λ to 800 nm and performing basic design, the thickness of each of the layers can be obtained as shown in FIG. 11. The high refractive index layer T6 is a layer formed on the plastic film and the low refractive index layer T1 is a layer that contacts air. The spectral characteristic 25a of the light-beam splitting mirror having a thickness obtained through basic design is indicated by a dashed line in FIG. 12. In FIG. 12, the horizontal axis shows wavelength (nm) and the vertical axis shows reflectivity (%).

In the spectral characteristic 25a, the reflectivity is less than 60% at a wavelength of 700 nm, which does not satisfy a reflectivity of 60% or more. Furthermore, the reflectivity at a wavelength of 400 to 650 nm is too low compared with the intended reflectivity (25% or more and 35% or less), and therefore optimization is performed.

As in Example 1, optimization was performed using TFCalc (registered trademark, available from Software Spectra Inc.). As a result of the optimization, the thickness of each of the layers T1 to T6 was obtained as shown in FIG. 11, and the spectral characteristic 25b was obtained as shown in FIG. 12. It is clear from FIG. 12 that optical characteristics including a reflectivity of 25% or more and 35% or less at a wavelength of 400 to 650 nm were achieved, but optical characteristics including a reflectivity of 60% or more at a wavelength of 700 nm were not achieved. That is, there is no solution to achieve the intended spectral characteristics with a six-layer structure.

It is clear from the above-described Reference Examples 1 and 2 that the intended optical characteristics can be achieved by employing a light-beam splitting mirror obtained by stacking at least eight optical thin films.

3. Modification

The present invention is not limited to above-described embodiments, and various modifications can be made on the basis of the technical idea of the present invention. For example, the software for optimization is a mere example and another software can also be used. Furthermore, a high refractive index material and a low refractive index material other than the high refractive index material and the low refractive index material exemplified in Examples can also be used. In this case, different thickness values are used.

The present application contains subject matter related to that disclosed in Japanese Priority Patent Application JP 2009-137289 filed in the Japan Patent Office on Jun. 8, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus comprising:
    a light-beam splitting mirror configured to transmit and reflect incident light that has entered the light-beam splitting mirror through a photographing optical system;
    an image sensor that receives light transmitted through the light-beam splitting mirror;
    an autofocus detecting unit that receives light reflected by the light-beam splitting mirror;
    a signal processing unit configured to process an image pickup signal of the image sensor; and
    a display unit configured to display an image being photographed, on the basis of an image signal obtained at the signal processing unit,
    wherein the light-beam splitting mirror has spectral characteristics including a reflectivity of 25% or more and 35% or less at all wavelengths from 400 to 650 nm and a reflectivity of 60% or more at a wavelength of 700 nm after optimization, and the light-beam splitting mirror includes only an even number of layers of a high refractive index material and the even number of layers of a low refractive index material alternately stacked on a plastic film.

2. The image pickup apparatus according to claim 1, wherein, assuming that H denotes a thickness of the high refractive index material and L denotes a thickness of the low refractive index material, the light-beam splitting mirror is obtained by stacking the layers composed of the high refractive index material and layers composed of the low refractive index material on the plastic film so as to satisfy formula (1) before optimizing thickness of the layers:

$$(HL)^n HL/2 \quad (1)$$

where n is an integer that indicates the number of repetitions (n>3).

3. The image pickup apparatus according to claim 1, wherein, in the spectral characteristics, the reflectivity is 60% or more in a wavelength range longer than the wavelength of 700 nm.

4. The image pickup apparatus according to claim 1, further comprising:
    an autofocus auxiliary light generating unit configured to generate autofocus auxiliary light having a wavelength of 700 nm.

5. The image pickup apparatus according to claim 1, wherein the light-beam splitting mirror reflects the incident light in an upward direction and the autofocus detecting unit is disposed at an upper position in a casing.

6. The image pickup apparatus according to claim 2, wherein the plastic film is composed of polyethylene terephthalate (PET), cycloolefin polymer (COP), polycarbonate (PC), polyethersulfone (PES), polyethylene naphthalate (PEN), or triacetyl cellulose (TAC).

7. The image pickup apparatus according to claim 2, wherein the high refractive index material is composed of $In_2O_3$, $SnO_2$, ZnO, ITO, or an alloy thereof; or a transparent conductive material obtained by doping ZnO with Al or Ga.

8. The image pickup apparatus according to claim 2, wherein the high refractive index material is composed of $Ta_2O_5$, $ZrO_2$, $Nb_2O_5$, or $TiO_2$.

9. The image pickup apparatus according to claim 2, wherein the low refractive index material is composed of $SiO_2$, $MgF_2$, or $AlF_3$.

10. The image pickup apparatus according to claim 1, wherein the even number is equal to 8 or more.

* * * * *